United States Patent
Bhide et al.

(10) Patent No.: US 11,068,797 B2
(45) Date of Patent: Jul. 20, 2021

(54) AUTOMATIC CORRECTION OF INDIRECT BIAS IN MACHINE LEARNING MODELS

(71) Applicant: INTERNATIONAL BUSINESS MACHINES CORPORATION, Armonk, NY (US)

(72) Inventors: Manish Bhide, Hyderabad (IN); Ruchir Puri, Baldwin Place, NY (US); Ravi Chandra Chamarthy, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 437 days.

(21) Appl. No.: 16/176,570

(22) Filed: Oct. 31, 2018

(65) Prior Publication Data
US 2020/0134493 A1     Apr. 30, 2020

(51) Int. Cl.
*G06N 5/04* (2006.01)
*G06F 9/54* (2006.01)
*G06N 20/00* (2019.01)

(52) U.S. Cl.
CPC ............ *G06N 5/048* (2013.01); *G06F 9/547* (2013.01); *G06N 20/00* (2019.01)

(58) Field of Classification Search
CPC combination set(s) only.
See application file for complete search history.

(56) References Cited

U.S. PATENT DOCUMENTS

| | | | | |
|---|---|---|---|---|
| 10,108,670 B2* | 10/2018 | Brand | ...................... | G06F 7/32 |
| 10,209,913 B2* | 2/2019 | Cho | ................... | G06F 12/0802 |
| 10,310,812 B2* | 6/2019 | Acar | ...................... | G06F 12/12 |
| 10,373,057 B2* | 8/2019 | Acar | ...................... | G06F 16/36 |
| 10,423,695 B2* | 9/2019 | Cho | ...................... | G06F 17/16 |
| 10,572,569 B2* | 2/2020 | Cho | ........................ | G06F 5/015 |
| 10,607,172 B2* | 3/2020 | Ayyagari | ............... | G05D 1/021 |
| 10,671,611 B2* | 6/2020 | Brand | ...................... | G06F 7/32 |
| 10,685,002 B2* | 6/2020 | Bordawekar | ............. | G06F 7/36 |
| 10,740,232 B2* | 8/2020 | Cho | ........................ | G06F 3/061 |
| 10,762,274 B2* | 9/2020 | Bhide | ............... | H04M 3/42348 |
| 10,783,161 B2* | 9/2020 | Bhide | .................... | G06F 16/84 |
| 10,831,738 B2* | 11/2020 | Bordawekar | .......... | G06F 16/23 |
| 2016/0217392 A1 | 7/2016 | Hashavit et al. | | |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Michael B Holmes
(74) *Attorney, Agent, or Firm* — Stephanie Carusillo; Andrew D. Wright; Roberts Calderon Safran & Cole, P.C.

(57) ABSTRACT

Systems and methods for detecting indirect bias in machine learning models are provided. A computer-implemented method includes: receiving, by a computer device, a user request to detect transitive bias in a machine learning model; determining, by the computer device, correlations of attributes of neighboring data not included in a dataset of the machine learning model; ranking, by the computer device, the attributes based on the determined correlations; and returning, by the computer device, a list of the ranked attributes to a user that generated the user request.

20 Claims, 6 Drawing Sheets

(56) References Cited

U.S. PATENT DOCUMENTS

2017/0330058 A1    11/2017    Silberman et al.

OTHER PUBLICATIONS

Hajian et al., "Algorithmic Bias: From Discrimination Discovery to Fairness-aware Data Mining", http://dx.doi.org/10.1145/2939672.2945386, Aug. 13-17, 2016, 2 pages.
Ziobaite, "Fairness-aware machine learning: a perspective", Aug. 3, 2017, 10 pages.
Courtland, "Bias detectives: the researchers striving to make algorithms fair", News Feature, Jun. 20, 2018, 13 pages.
Baer et al., "Controlling machine-learning algorithms and their biases", McKinsey&Company, Nov. 2017, 11 pages.

* cited by examiner

AUTOMATIC CORRECTION OF INDIRECT BIAS IN MACHINE LEARNING MODELS

BACKGROUND

The present invention relates generally to machine learning models and, more particularly, to automated detecting and correcting of indirect bias in machine learning models.

Predictive modeling based on machine learning is a technology that is blossoming with the advent of powerful computers, the Internet, and mass-scale digitization of information. Machine learning models are constructed by machine learning algorithms that discover patterns in data (training data), and are used to then make predictions based on future data (run time data). Such machine learning models are currently used in business decision making, such as loan approval decisions and product pricing decisions to name but a few examples. Detecting bias in machine learning models is an emerging technology that seeks to ensure that the machine learning models make unbiased (e.g., "fair") predictions when using run time data.

SUMMARY

In a first aspect of the invention, there is a computer-implemented method including: receiving, by a computer device, a user request to detect transitive bias in a machine learning model; determining, by the computer device, correlations of attributes of neighboring data not included in a dataset of the machine learning model; ranking, by the computer device, the attributes based on the determined correlations; and returning, by the computer device, a list of the ranked attributes to a user that generated the user request.

In another aspect of the invention, there is a computer program product including a computer readable storage medium having program instructions embodied therewith. The program instructions are executable by a computing device to cause the computer device to: receive a user request to detect hidden bias in a machine learning model; classify data included in a dataset of the machine learning model based on the user request; obtain auxiliary information based on the classifying; determine correlations of attributes of the auxiliary information; rank the attributes based on the determined correlations; and return a list of the ranked attributes to a user that generated the user request.

In another aspect of the invention, there is system including a processor, a computer readable memory, and a computer readable storage medium. The system includes: program instructions to receive a user request to detect hidden bias in a machine learning model; program instructions to classify data included in a dataset of the machine learning model; program instructions to obtain auxiliary information based on the classifying; program instructions to determine correlations of attributes of the auxiliary information; program instructions to rank the attributes based on the determined correlations; and program instructions to return a list of the ranked attributes to a user that generated the user request. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to machine learning models and, more particularly, to automated detecting and correcting of indirect bias in machine learning models. According to aspects of the invention, indirect bias is detected in machine learning models by analyzing data that is not part of the dataset of the model. The indirect bias may be transitive bias or hidden bias, and may be run time bias or design time bias. In this manner, implementations of the invention provide a system and method for identifying indirect bias in a machine learning model.

Having bias in machine learning models is a barrier to some enterprises in the adoption of algorithm-based business decision making. Enterprises are extremely careful to avoid the negative consequences that might accrue from basing business decision on biased models. Hence there is a need for a solution which helps enterprises be confident that their machine learning models are not biased.

There are conventional techniques to detect bias in machine learning models. However, all of the conventional techniques rely on the assumption that the training data used for building the model has all the attributes which can lead to a bias. In an illustrative example of a lending institution that uses a machine learning model in making a decision whether to approve or deny a loan application, conventional bias detection algorithms are able to detect bias in this model only when the attribute on which the model is biased is part of the training data. As a result, conventional bias detection techniques are limited to direct bias because these techniques analyze only the data that is used by the model, i.e., data that is part of the training set of the model. However, the inventors have found that it is not always true that the attribute on which bias is based is part of the training data. As such, aspects of the invention are directed to detecting such kinds of indirect biases in machine learning models and deployments.

Transitive bias as used herein refers to the situation when a bias is present because of some attribute which is not present in the training data of the model, but the attribute is included in neighboring data that is related to the training data and that is available within the enterprise. An example of transitive bias is a scenario where a machine learning model is used in making a decision whether to approve or deny a loan application, and in which the gender of the loan applicant is not part of the machine learning model but is included in the loan applicant's profile which is on file with the lending institution. This gender data is thus neighboring data because it is not being considered by the model but is available within the data records of the enterprise. Aspects of the invention are used to determine whether this, and other, neighboring data is sufficiently correlated to the model to identify an indirect bias in the model (e.g., that the model is outputting predictions that are biased based on gender in this example). As a result of identifying such an attribute of indirect transitive bias, the enterprise may take steps to determine whether the model is in fact biased in this regard and, if so, perform remediation steps such as reformulating the model to avoid the bias (e.g., by automated analysis and modifying based on the analysis to prevent or mitigate the bias), suspending decision making based on the model, etc.

Hidden bias as used herein refers to the situation when a bias is present because of some attribute which is not present in the training data of the model, and the enterprise is not aware of this attribute. In this type of indirect bias, the enterprise is not even aware of the attribute that may be the cause of the bias in the model. In the example of the lending institution that uses a machine learning model to make a decision whether to approve or deny a loan application, the model may unintentionally be biased against applicants that have a particular primary language. However, since the lending institution does not collect or otherwise know this data about it applicants, there is no way for the lending institution to know that the model is biased based on this data attribute. Aspects of the invention are used to determine whether such unknown data is sufficiently correlated to the model to identify an indirect bias in the model (e.g., that the model is outputting predictions that are biased based on primary language in this example). As a result of identifying such an attribute of indirect hidden bias, the enterprise may take steps to determine whether the model is in fact biased in this regard and, if so, perform remediation steps such as reformulating the model to avoid the bias (e.g., by automated analysis and modifying based on the analysis to prevent or mitigate the bias), suspending decision making based on the model, etc.

Aspects of the invention are thus directed to a system and method for detecting both transitive bias as well as hidden bias. Embodiments are configured to perform both run time bias detection as well as design time bias detection. In a run time bias detection implementation, the system and method detect bias using the data that is sent to the model for prediction at run time. In a design time bias detection implementation, the system and method detect bias using the training data which is used for building the model.

Aspects of the invention provide a technical solution to the technical problem of detecting bias in machine learning models, the technical solution including detecting indirect bias by analyzing data that is not used by the model, e.g., detecting bias that is not directly present in the training data but that is present indirectly via other data that is not part of the training data. In this manner, aspects of the invention perform the unconventional step(s) of analyzing data that is not part of the training data of a machine learning model in order to detect indirect bias of the model. Embodiments of the invention also utilize aspects that are rooted in computer technology, including machine based classification using natural language processing and application program interfaces. Aspects of the invention also improve the technical field of machine learning models by providing unconventional techniques for detecting indirect bias in machine learning models and, thus, improving the accuracy and reliability of machine learning models.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
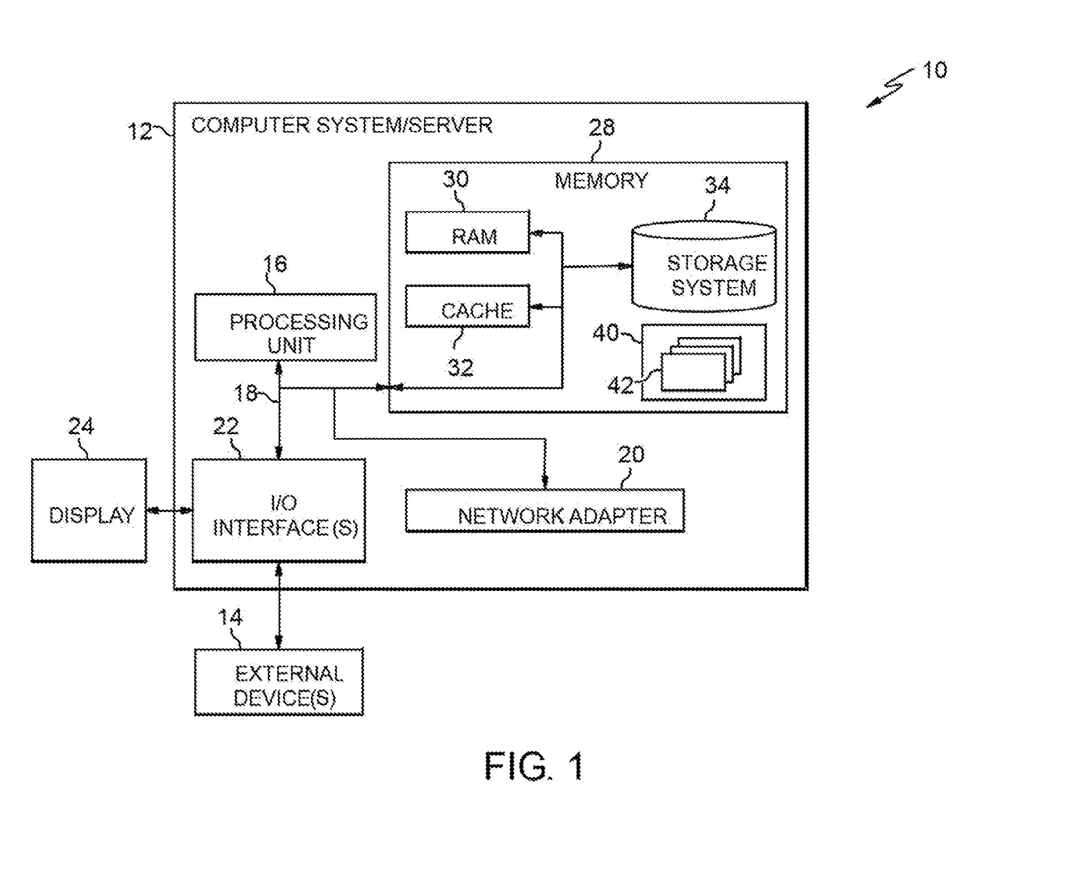
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
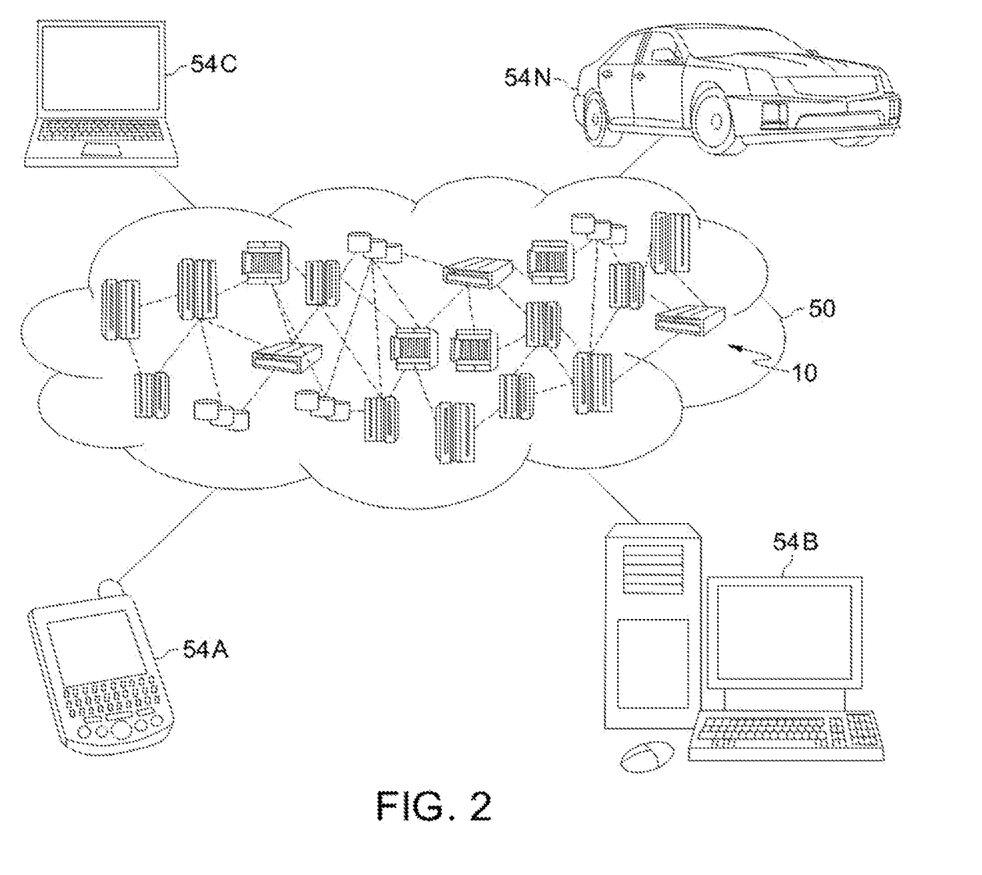
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
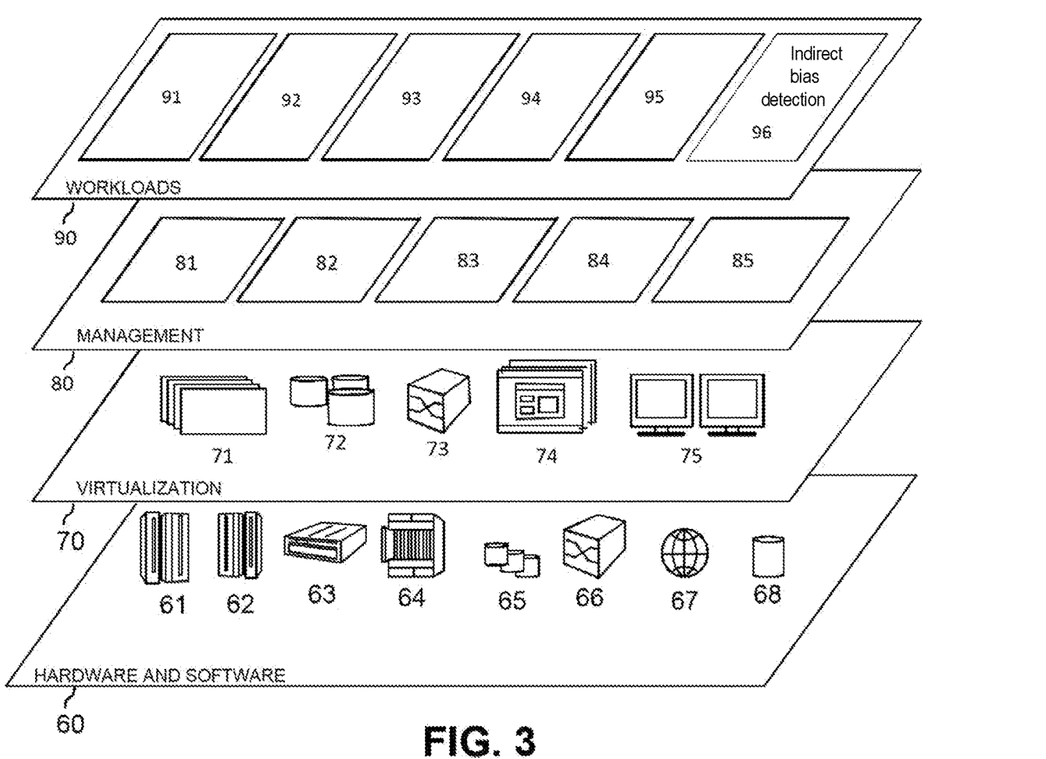
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and indirect bias detection 96.

Implementations of the invention may include a computer system/server 12 of FIG. 1 in which one or more of the program modules 42 are configured to perform (or cause the computer system/server 12 to perform) one of more functions of the indirect bias detection 96 of FIG. 3. In one example, the one or more of the program modules 42 are configured to: receive user input to detect transitive bias; determine correlations of attributes of neighboring data not included in a dataset of the model; rank the attributes of neighboring data based on the correlations; and return a list of the ranked attributes to the user. In another example, the one or more of the program modules 42 are configured to: receive user input to detect hidden bias; create a table of the data used by a machine learning model; classify each column of the table; obtain auxiliary information based on the classifying; determine correlations of attributes of the auxiliary information not included in a dataset of the model; rank the attributes of auxiliary information based on the correlations; and return a list of the ranked attributes to the user.

Figure 4:
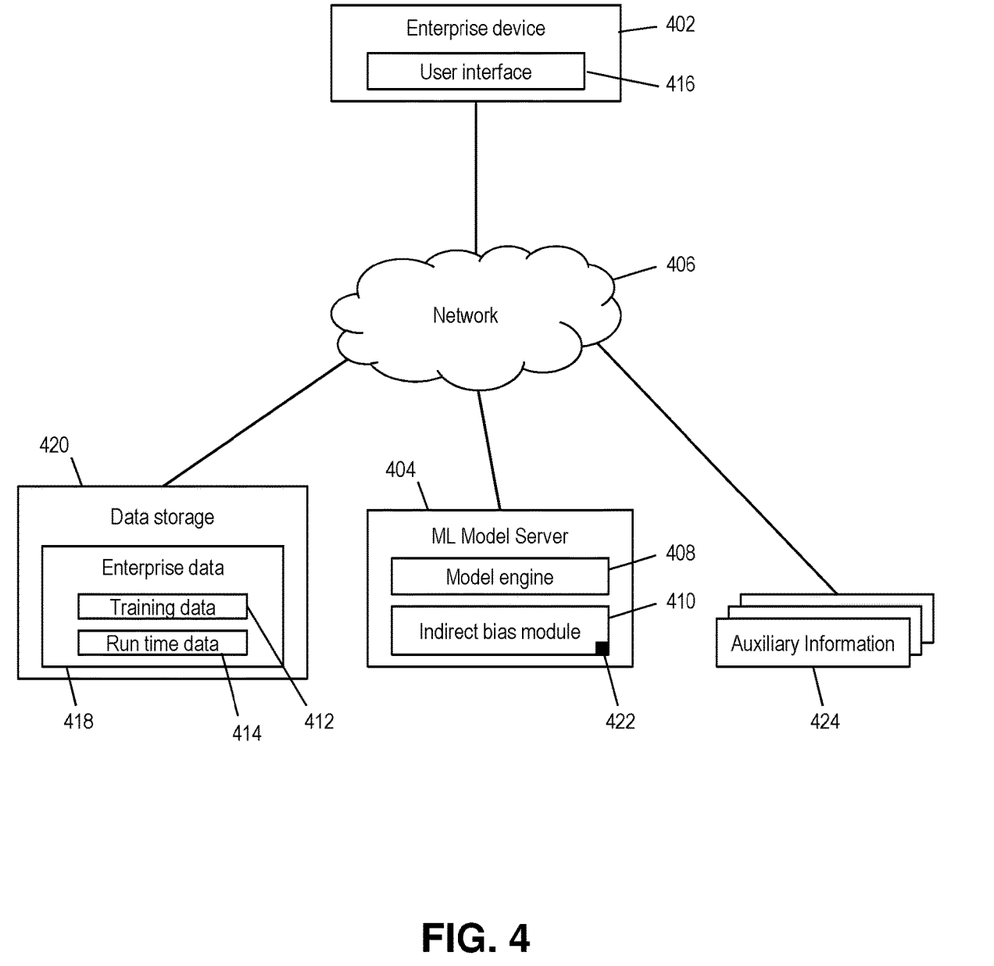
FIG. 4 shows a block diagram of an exemplary environment in accordance with aspects of the invention.

FIG. 4 shows a block diagram of an exemplary environment in accordance with aspects of the invention. In embodiments, the environment includes an enterprise device 402 that communicates with a machine learning (ML) model server 404 via a network 406. The ML model server 404 is a computer device such as the computer system/server 12 of FIG. 1. In embodiments, the ML model server 404 includes a model engine 408 and an indirect bias module 410, each of which may comprise one or more program modules 42 as described with respect to FIG. 1. The model engine 408 is configured to create a machine learning model based on training data 412, and to run the machine learning model using run time data 414, wherein running the machine learning model produces an output such as a prediction based on the run time data.

The enterprise device 402 is a computer device such as a desktop computer, a laptop computer, a tablet computer, and a smartphone, and may comprise one or more elements of the computer system/server 12 of FIG. 1. In embodiments, the enterprise device 402 stores and runs a program module (such as a client program) that generates a user interface 416 by which a user of the enterprise device 402 interacts with services provided by the ML model server 404. In particular embodiments, a user of the enterprise device 402 uses the user interface 416 to interact with the model engine 408 to specify training data 412 to train the machine learning model, to specify run time data 414 to run the machine learning model, and to receive an output (e.g., prediction) generated by running the machine learning model.

In embodiments, the network 406 is a communication network or combination of communication networks such as a LAN, WAN, and the Internet. In a particular embodiment, the network 406 is a cloud computing environment (such as environment 50 of FIG. 2), the ML model server 404 is a cloud computing node (such as node 10 of FIG. 2), and the enterprise device 402 is a local computing device (such as local computing devices 54A-N of FIG. 2) used by a cloud consumer.

As depicted in FIG. 4, the training data 412 and the run time data 414 are part of enterprise data 418 that is stored at data storage 420. In embodiments, the enterprise data 418 and the enterprise device 402 are controlled or owned by the same entity, i.e., the enterprise. For example, the enterprise may be a lending institution, the enterprise device 402 may be a laptop computer used by an employee of the lending institution used in performing their job for the lending institution, and the enterprise data 418 may comprise data that is collected by the lending institution. In embodiments, the enterprise data 418 includes data other than the training data 412 and the run time data 414. For example, the enterprise data 418 may include data that is not used as part of any machine learning model. In another example, the enterprise data 418 may include other data that is used in a different machine learning model (i.e., other than the machine learning model that uses the training data 412 and the run time data 414). In this regard, the data that is included in the enterprise data 418 and that is not included in the training data 412 and the run time data 414 is referred to as neighboring data.

The data storage 420 is a data storage system such as storage system 34 of FIG. 1. In one embodiment, the data storage 420 is controlled or owned by the enterprise, and may be physically co-located with the enterprise device 402. In another embodiment, the data storage is controlled or owned by an entity other than the enterprise (such as a cloud service provider) and is physically remote from the enterprise device 402 (such as at a cloud computing node). In the latter embodiment, although the data storage 420 is controlled or owned by an entity other than the enterprise, the enterprise data 418 that is stored on the data storage 420 is controlled or owned by the enterprise.

Still referring to FIG. 4, according to aspects of the invention, the indirect bias module 410 is configured to detect indirect bias in the machine learning model that is run by the model engine 408. In embodiments, the indirect bias module 410 includes a callback API (application program interface) 422 that the user calls via the user interface 416 to invoke the services of the indirect bias module 410.

In an embodiment to detect transitive bias, the indirect bias module 410 is configured to: receive user input to detect transitive bias; determine correlations of attributes of neighboring data not included in a dataset of the model; rank the attributes of neighboring data based on the correlations; and return a list of the ranked attributes to the user. Transitive bias detection as described herein can be performed to detect either run time bias and design time bias. In run time bias detection, the method uses data which is sent to the machine learning model for prediction at run time (e.g., the run time data 414). In design time bias detection, the method focuses on detecting bias using the training data which is used for building the machine learning model (e.g., the training data 412). These steps of transitive bias detection are described herein with reference to the flowchart shown in FIG. 5.

In an embodiment to detect hidden bias, the indirect bias module 410 is configured to: receive user input to detect hidden bias; create a table of the data used by a machine learning model; classify each column of the table; obtain auxiliary information based on the classifying; determine correlations of attributes of the auxiliary information not included in a dataset of the model; rank the attributes of auxiliary information based on the correlations; and return a list of the ranked attributes to the user. In hidden bias detection, the system provides a mechanism to automatically detect attributes which point to different types of features such as zip code, address, person name, country, etc. The system then obtains different kinds of information (referred to as auxiliary information 424) related to each of these values. For example, the system may obtain data defining a primary language distribution for a given address or zip code, income distribution for a zip code, etc. In embodiments, the system is configured to determine classifications based on the dataset of the model, and obtain auxiliary information about new attributes which could potentially contribute to bias. Hidden bias detection as described herein can be performed to detect either run time bias and design time bias. In run time bias detection, the method uses data which is sent to the machine learning model for prediction at run time (e.g., the run time data 414). In design time bias detection, the method focuses on detecting bias using the training data which is used for building the machine learning model (e.g., the training data 412). These steps of hidden bias detection are described herein with reference to the flowchart shown in FIG. 6.

Figure 5:
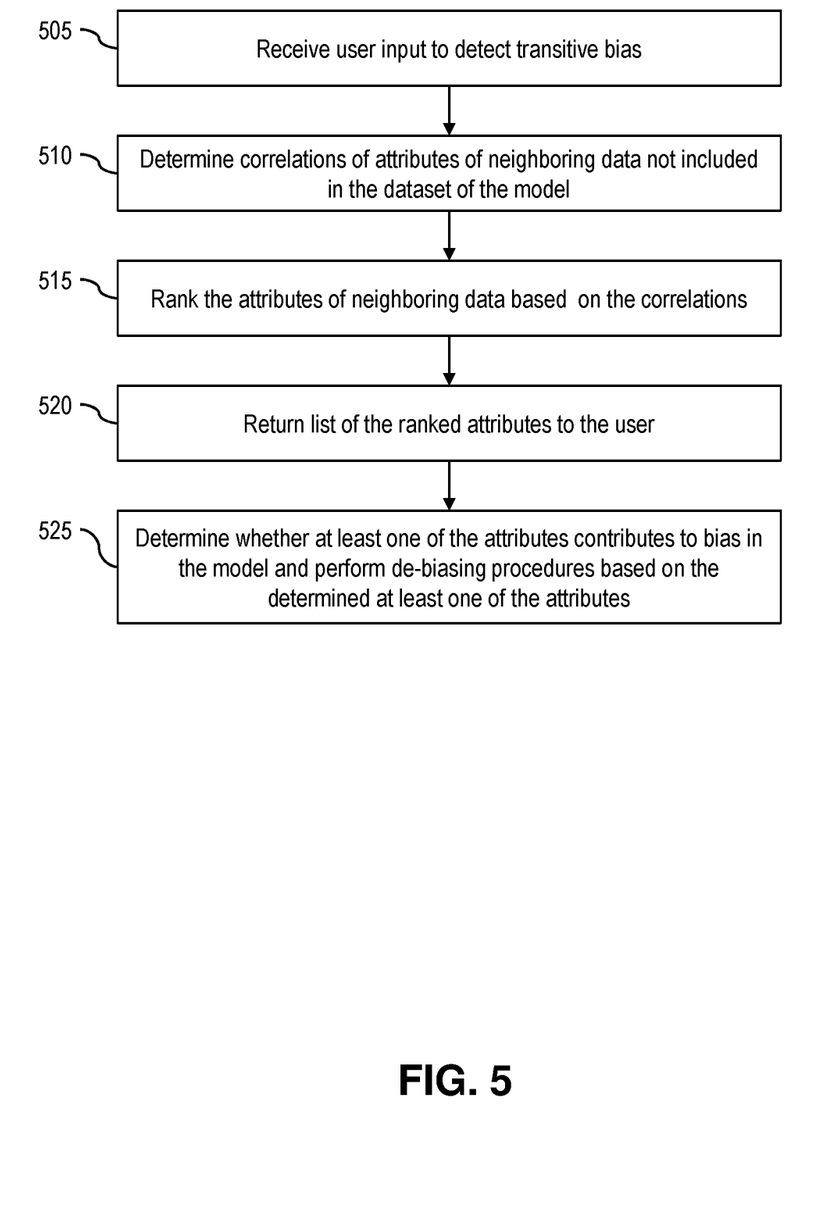
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system receives user input to detect transitive bias. In embodiments, the indirect bias module 410 receives user input (e.g., a request) to detect transitive bias via the callback API 422. In embodiments, the user makes the request by providing input via the user interface 416, the input including: an identification of the machine learning model to be analyzed, an identification of the training data 412, an identification of the run time data 414, and an identification of the enterprise data 418. The indications may include links, pointers, file names, etc. In a particular embodiment, the request includes a record which was sent to the machine learning model. In this embodiment, the record includes information about different feature vectors of the model, examples of a feature vector being a row of run time data 414 (e.g., for run time bias detection) and a row of training data (e.g., for design time bias detection). In this embodiment, the record may also include a transaction ID that is used to track this transaction (i.e., this particular request and resulting analysis of the machine learning model). In embodiments, the user request also indicates to perform either run time bias detection (e.g., based on run time data) or design time bias detection (e.g., using training data). In embodiments, the request is communicated from the user interface 416 to the indirect bias module 410 via the callback API 422.

At step 510, the system determines correlations of attributes of neighboring data not included in the dataset of the model. In embodiments, in response to receiving the user input (at step 505), the indirect bias module 410 determines correlations of attributes of the enterprise data 418 that are not included in the training data 412 and the run time data 414. For example, in the previously described use case of a machine learning model that is used to approve or deny loan applications, the training data 412 and the run time data 414 may include name, address, and income of the loan applicant. In this use case, the enterprise data 418 includes other data for each applicant, such as gender, height, and hair color, for example. The other data (i.e., such as gender, height, and hair color) is neighboring data because it is included in the enterprise data 418 but is not included in the training data 412 and the run time data 414. In embodiments, step 510 includes the indirect bias module 410 determining the neighboring data, e.g., by comparing the enterprise data 418 to the training data 412 and the run time data 414 and determining which attributes of the enterprise data 418 are not included in the training data 412 and the run time data 414.

Still referring to step 510, according to aspects of the invention, the indirect bias module 410 determines a correlation of each attribute of the neighboring data (i.e., of each of the gender, height, and hair color in this example) to the output of the machine learning model. Any desired statistical method can be used to determine the correlation. In embodiments, the correlation is expressed as a quantitative score that represents strength of the correlation between the respective attribute of the neighboring data and the output of the machine learning model. For example, the correlation may be a numeric value between −1 and 1, with a value of −1 representing a strong negative correlation, a value of 1 representing a strong positive correlation, and a value of 0 representing no correlation. In this manner, the correlation is a numeric score that indicates how strongly correlated one of the attributes of the neighboring data is to the output of the machine learning model.

At step 515, the system ranks the attributes of neighboring data based on the correlations. In embodiments, after determining a respective correlation for each of the attributes of the neighboring data (at step 510), the indirect bias module 410 ranks the attributes of the neighboring data according to the correlations (e.g., highest correlation to lowest).

At step 520, the system returns a list of the ranked attributes to the user. In embodiments, the indirect bias module 410 sends the ranked list to the enterprise device 402, via the callback API 422, to be displayed via the user interface 416. Upon determining the ranked list of attributes of neighboring data, the system may perform additional steps to address any identified bias in the model. For example, at step 525, the system determines whether at least one of the attributes contributes to bias in the model and performs de-biasing procedures based on the determined at least one of the attributes. In embodiments, the system uses additional bias detection algorithms with the identified attributes to determine how much (to what extent) at least one of the attributes from the ranked list actually contributes to bias in the model. In an example, step 525 comprises the indirect bias module 410 (or another module of the server 404) performing bias prevention in data by selecting different sampling techniques (e.g., stratified sampling, random sampling, systematic sampling, etc.) from heterogeneous data sets and performing automated bias checking using the selected sampling techniques. The selecting of the different sampling techniques may be automated (e.g., based on rules) or based on user input. When based on user input, the input may be received at a pre-configuration on step (e.g., such as remediation options/settings configured at setup) or received after run time (e.g., such as selected by a user in response to step 520). In another example, step 525 comprises the indirect bias module 410 (or another module of the server 404) performing bias mitigation by selecting a different estimator of the machine learning model and running it against the same design data (e.g., training data) or runtime data, to determine a difference in bias estimation. The selecting of the different estimator and running it against the same design data or runtime data, to determine a difference in bias estimation, may be automated (e.g., based on rules) or based on user input. In embodiments, step 525 comprises the system revising the machine learning model based on the bias prevention and/or bias mitigation described in these examples.

Figure 6:
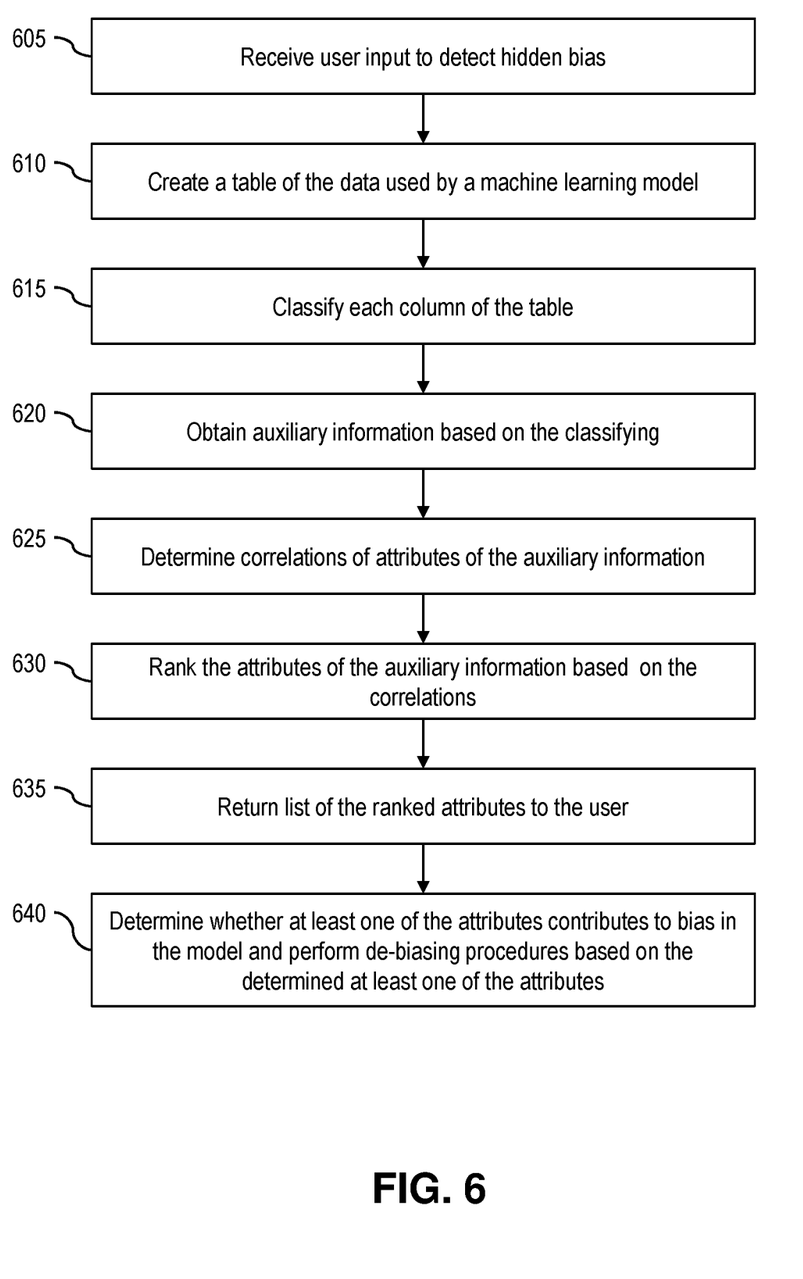
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system receives user input to detect hidden bias. In embodiments, the indirect bias module 410 receives user input (e.g., a request) to detect hidden bias via the callback API 422. In embodiments, the user makes the request by providing input via the user interface 416, the input including: an identification of the machine learning model to be analyzed, an identification of the training data 412, and an identification of the run time data 414. In embodiments, the user request also indicates to perform either run time bias detection (e.g., based on run time data) or design time bias detection (e.g., using training data). In embodiments, the request is communicated from the user interface 416 to the indirect bias module 410 via the callback API 422.

At step 610, the system creates a table of the data used by a machine learning model. In embodiments for detecting run time bias, the indirect bias module 410 creates a run time table from the run time data 414. In embodiments for detecting design time bias, the indirect bias module 410 creates a design time table from the training data 412.

At step 615, the system classifies each column in the table. In embodiments, the indirect bias module 410 classifies each column of the table that was created at step 610. In embodiments, the classifying is performed using cognitive classification techniques such as natural language processing. In this manner, each column of the table is provided with at least one classification label (e.g., such as zip code, address, country, income, etc.).

At step 620, the system obtains auxiliary information based on the classifying. In embodiments, the indirect bias module 410 obtains auxiliary information 424 that is related to respective ones of the determined classifications and that is not included in the enterprise data 418. For example, if one of the columns is classified as zip code, then the indirect bias module 410 may perform web crawling to obtain auxiliary information 424 that is related to zip code, such as primary language distribution according to zip code. In another example, if one of the columns is classified as income, then the indirect bias module 410 may perform web crawling to obtain auxiliary information 424 that is related to income, such as income distribution according to age. As used herein, auxiliary information refers to data that is not included in any of the training data 412, the run time data 414, and the enterprise data 418. In embodiments, the indirect bias module 410 obtains auxiliary information 424 using automated techniques such as web crawling. Additionally or alternatively, the user may specify the auxiliary information 424, for example by providing a hyperlink or file selection via the user interface 416.

At step 625, the system determines correlations of attributes of the auxiliary information. According to aspects of the invention, in response to determining the auxiliary information (at step 620), the indirect bias module 410 determines a correlation of each attribute of the auxiliary information (i.e., each of primary language and age in this example) to the output of the machine learning model. Any desired statistical method can be used to determine the correlations. In embodiments, the correlation is expressed as a quantitative score that represents strength of the correlation between the respective attribute of the auxiliary information and the output of the machine learning model. For example, the correlation may be a numeric value between −1 and 1, with a value of −1 representing a strong negative correlation, a value of 1 representing a strong positive correlation, and a value of 0 representing no correlation. In this manner, the correlation is a numeric score that indicates how strongly correlated one of the attributes of the auxiliary information is to the output of the machine learning model.

At step 630, the system ranks the attributes of the auxiliary information based on the correlations. In embodiments, after determining a respective correlation for each of the attributes of the auxiliary information (at step 625), the indirect bias module 410 ranks the attributes of the auxiliary information according to the correlations (e.g., highest correlation to lowest).

At step 635, the system returns a list of the ranked attributes to the user. In embodiments, the indirect bias module 410 sends the ranked list to the enterprise device 402

(e.g., via the callback API 422) to be displayed via the user interface 416. Upon determining the ranked list of attributes, the system may perform additional steps to address any identified bias in the model. For example, at step 640, the system determines whether at least one of the attributes contributes to bias in the model and performs de-biasing procedures based on the determined at least one of the attributes. In embodiments, the system uses additional bias detection algorithms with the identified attributes to determine how much (to what extent) at least one of the attributes from the ranked list actually contributes to bias in the model. In an example, step 640 comprises the indirect bias module 410 (or another module of the server 404) performing bias prevention in data by selecting different sampling techniques (e.g., stratified sampling, random sampling, systematic sampling, etc.) from heterogeneous data sets and performing automated bias checking using the selected sampling techniques. The selecting of the different sampling techniques may be automated (e.g., based on rules) or based on user input. When based on user input, the input may be received at a pre-configuration on step (e.g., such as remediation options/settings configured at setup) or received after run time (e.g., such as selected by a user in response to step 520). In another example, step 640 comprises the indirect bias module 410 (or another module of the server 404) performing bias mitigation by selecting a different estimator of the machine learning model and running it against the same design data (e.g., training data) or runtime data, to determine a difference in bias estimation. The selecting of the different estimator and running it against the same design data or runtime data, to determine a difference in bias estimation, may be automated (e.g., based on rules) or based on user input. In embodiments, step 640 comprises the system revising the machine learning model based on the bias prevention and/or bias mitigation described in these examples.

Aspects of the invention as described herein are thus useable to provide a system and method to identify indirect bias in a machine learning model. In one embodiment, the indirect bias is hidden bias and the method includes automatically detecting an attribute which points to different kinds of features such as zip code, address, person name, etc. The method may include deriving additional attributes such as, income range, gender, etc., which can contribute to the bias. In another embodiment, the bias is transitive bias and the method includes providing a call back based mechanism which finds additional neighboring data to detect bias.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computer device, a user request to detect transitive bias in a machine learning model;
determining, by the computer device, correlations of attributes of neighboring data not included in a dataset of the machine learning model;
ranking, by the computer device, the attributes based on the determined correlations; and
returning, by the computer device, a list of the ranked attributes to a user that generated the user request.

2. The computer-implemented method of claim 1, wherein:
the computer device is a server;
the server receives the user request from an enterprise device via a callback application program interface (API); and
the server returns the list of the ranked attributes to the enterprise device via the callback API.

3. The computer-implemented method of claim 1, wherein the dataset of the machine learning model comprises training data and run time data.

4. The computer-implemented method of claim 3, further comprising the computer device determining the neighboring data prior to the determining the correlations of the attributes.

5. The computer-implemented method of claim 1, wherein the user request comprises:
an identification of the machine learning model; and
an identification of feature vectors of the machine learning model.

6. The computer-implemented method of claim 1, wherein the user request comprises an indication to perform run time bias detection of the machine learning model.

7. The computer-implemented method of claim 1, wherein the user request comprises an indication to perform design time bias detection of the machine learning model.

8. A computer program product, the computer program product comprising a computer readable storage medium having program instructions embodied therewith, the program instructions executable by a computing device to cause the computer device to:
receive a user request to detect hidden bias in a machine learning model;
classify data included in a dataset of the machine learning model based on the user request;
obtain auxiliary information based on the classifying;
determine correlations of attributes of the auxiliary information;

rank the attributes based on the determined correlations; and return a list of the ranked attributes to a user that generated the user request.

9. The computer program product of claim 8, wherein the computer device is a server that receives the user request from an enterprise device via a callback application program interface (API).

10. The computer program product of claim 9, wherein the server returns the list of the ranked attributes to the enterprise device via the callback API.

11. The computer program product of claim 8, wherein the dataset of the machine learning model comprises training data and run time data.

12. The computer program product of claim 8, wherein the user request comprises an identification of the machine learning model.

13. The computer program product of claim 12, wherein the user request comprises an indication to perform run time bias detection of the machine learning model.

14. The computer program product of claim 12, wherein the user request comprises an indication to perform design time bias detection of the machine learning model.

15. A system comprising:
a processor, a computer readable memory, and a computer readable storage medium;
program instructions to receive a user request to detect hidden bias in a machine learning model;
program instructions to classify data included in a dataset of the machine learning model;
program instructions to obtain auxiliary information based on the classifying;
program instructions to determine correlations of attributes of the auxiliary information;
program instructions to rank the attributes based on the determined correlations; and
program instructions to return a list of the ranked attributes to a user that generated the user request,
wherein the program instructions are stored on the computer readable storage medium for execution by the processor via the computer readable memory.

16. The system of claim 15, wherein:
the processor is included in a server;
the server receives the user request from an enterprise device via a callback application program interface (API); and
the server returns the list of the ranked attributes to the enterprise device via the callback API.

17. The system of claim 16, wherein the dataset of the machine learning model comprises training data and run time data.

18. The system of claim 17, wherein the user request comprises an identification of the machine learning model.

19. The system of claim 18, wherein the user request comprises an indication to perform run time bias detection of the machine learning model.

20. The system of claim 18, wherein the user request comprises an indication to perform design time bias detection of the machine learning model.

* * * * *